Patented Sept. 22, 1936

2,055,135

UNITED STATES PATENT OFFICE 2,055,135

PRODUCTION OF VALUABLE OILS FROM ASPHALTIC AND RESINOUS HYDROCARBON MIXTURES

Mathias Pier and August Eisenhut, Heidelberg, Germany, assignors to I. G. Farbenindustrie Aktiengesellschaft, Frankfort-on-the-Main, Germany No Drawing. Application June 27, 1934, Serial No. 732,626. In Germany July 8, 1933

9 Claims. (Cl. 196—13)

The present invention relates to the production of valuable oils from asphaltic and resinous hydrocarbon mixtures.

It has already been proposed to separate liquid or solid carbonaceous materials composed of different constituents having different solubility in low boiling hydrocarbons, as for example in benzine or liquefied normally gaseous hydrocarbons, such as pentane or butane into these constituents by extraction with these low boiling hydrocarbons. Thus it has been suggested to separate in this manner oils from hydrocarbon mixtures containing the same together with solid or semi-solid substances, such as resins, waxes and asphalts. Owing to the fact that only an incomplete separation can be effected with the said agents, it has further been proposed to employ solvents containing substantially only the first three members of the methane series. Ordinary or elevated temperature may be employed for this purpose.

We have now found that the said separation with the said low boiling hydrocarbons, such as benzine or, more advantageously liquefied normally gaseous hydrocarbons, can be rendered complete by carrying out the treatment first at a temperature at which under the pressure employed the solvent is present in the vaporized state, which means either gaseous or vaporous, and then at a temperature at which under the pressure employed at least part, and preferably all, of the solvent is present as a liquid. The temperature for the operation with the liquid solvent is below the critical temperature of this solvent and preferably above 20° C. If a mixture of more than one hydrocarbon is employed as solvent the temperature should be below the critical temperature of the hydrocarbon forming the main constituent of the solvent. The said operation with the liquid solvent may also be effected in several stages at successively reduced temperatures.

The more complete separation effected by this treatment is probably due to the fact that the solvent when present in the vaporized state is capable of thoroughly penetrating the carbonaceous materials to be extracted and thereby when subjected to condensation conditions, dissolves out more completely the extractable constituents than is possible if the materials to be extracted are directly subjected to the treatment with the liquid solvents.

The treatment with the vaporized solvent is carried out under ordinary or usually under elevated pressures which preferably range above 5 atmospheres, more particularly above 20 atmospheres. This treatment at elevated pressures has the advantage that no large volumes and consequential employment of complicated apparatus is necessary and probably the penetration of the materials to be extracted with the vaporized solvent is rendered more thorough than under atmospheric pressure. The treatment with the liquid solvent is also preferably effected at the said elevated pressures since in this case it is possible to employ higher extraction temperatures than is possible under atmospheric pressure. In this treatment the particular pressures depend upon the temperatures and the nature of the liquid solvents employed.

Preferably the treatment with the said solvents is first carried out, at or above the critical temperature of the solvent employed and then with the liquid solvent at an elevated temperature which is below the said critical temperature.

This treatment at or above the critical temperature is preferably effected at or above the critical pressure which pressure is advantageously produced simply by heating the solvent in a space having a restricted volume, whereupon the conditions suitable for the extraction with the liquid solvent are established by cooling likewise in a space having a restricted volume. In this manner it is attained that the greatest part or all of the solvent employed is present in the liquid state, which is very advantageous.

As initial materials to be treated may be mentioned tars, mineral oils, or high boiling distillation or conversion products of the same, as for example products obtained by cracking mineral oils or distillation residues thereof, or by destructive hydrogenation of coals, tars or mineral oils, or oil-bearing pitches containing paraffin wax from all of which oils may be extracted. Further crude waxy materials containing paraffin wax or other valuable waxes, as for example Montan wax pitch, may be purified by extracting the wax by the above-described process, the insoluble portion consisting mainly of asphaltic constituents remaining undissolved.

To carry out the process, the initial materials are mixed for example in a vessel with from 2 to 7 times their volume of low-boiling, in particular liquefied, hydrocarbons, especially propane or ethane or mixtures of the same, and led through a vessel, advantageously a spiral pipe, situated in a heating medium, as for example an oil bath. The temperature of the heating medium is so selected that the treated mixture acquires a temperature which is more than or equal to the critical temperature of the solvent. When employing propane, which has a critical temperature of 97° C. a temperature of from about 97° to 100° C. or somewhat higher is employed. After passage through this vessel, the mixture is supplied to a second vessel, as for example a second spiral pipe, in which the mixture is kept at a temperature about 5° to 20° C. lower than the critical temperature of the solvent, as for example at 90° C. The mixture then passes into a sedimentation vessel in which the separation of the mixture into oil, paraffin waxes and asphalt takes place.

When bringing together for example liquid propane and an initial material from which valuable substances are to be dissolved out by the said solvent, the completeness of the extraction depends mainly on causing the most intimate contact possible between the extremely thinly liquid solvent and the initial material to be extracted which is usually very viscous. The best results are obtained when care is taken that the two remain in contact for a sufficiently long period of time and when care is taken that the surface is continually renewed by special means, as for example by intense stirring or shaking. The said means usually lead, however, to troublesome apparatus which, in order to ensure the necessary protracted contact of the materials, must frequently be very large. By working according to this invention, however, the conditions within the mixture change to such an extent when the temperature of condensation, preferably the critical temperature is reached that an intimate mixing is spontaneously obtained equivalent to a stirring of great intensity. The use of a high speed of flow in the spiral pipes of from ½ to 1 meter or more in length in which the heating takes place prevents any separation of gas and liquid. During the cooling in the second spiral pipe, the extraction agent is condensed again whereby the fractions which could not be penetrated by the extraction agent are rendered accessible to the extraction.

The following examples will further illustrate the nature of this invention but the invention is not restricted to these examples.

*Example 1*

Montan wax pitch which has been mixed in the ration of 1:1 with illuminating oil, is mixed with from 4 to 5 times its volume of liquid propane. The mixture then flows through a spiral pipe of 2 millimeters cross section and 20 meters length and is heated to about 100° C. by means of an oil bath. The mixture then flows through a second spiral pipe in which it is cooled to from about 80° to 90° C. and then passes into a suitable sedimentation vessel in which the undissolved material is separated from the dissolved. In this manner are obtained, 35 per cent of a high quality wax having a melting point of 75° C., representing a high molecular ketone having the properties of wax. This wax may be converted by subsequent hydrogenation into high molecular paraffinic hydrocarbons. If the same mixture only be heated to temperatures below the critical temperature but in the neighborhood thereof, as for example at from 90° to 95° C., only from 25 to 28 per cent of extract are obtained.

*Example 2*

A residue obtained by topping German petroleum is treated in the manner described in Example 1. About 73 per cent of a high quality lubricating oil are thus extracted from the residue, while when working at a temperature below the critical temperature only, at the most from 55 to 60 per cent of the said high quality lubricating oil are obtained.

What we claim is:—

1. A process for the separation of a carbonaceous material composed of different constituents having different solubilities in low boiling hydrocarbons, into these constituents which comprises treating said carbonaceous material with such low boiling hydrocarbon at a temperature at which under the pressure employed the said low boiling hydrocarbon is in the vaporized state, and then changing the conditions of temperature and contingently of pressure maintained upon the resulting mixture of said carbonaceous material and low boiling hydrocarbon so that an elevated temperature above 20° C. and a pressure are established at which the liquefied state of this low boiling hydrocarbon is maintained, part of the said carbonaceous material thereby being dissolved in the said low boiling hydrocarbon, and then separating this dissolved part from the part of the carbonaceous material remaining undissolved.

2. In the process as claimed in claim 1 effecting the treatment with the low boiling hydrocarbon under an elevated pressure above 5 atmospheres.

3. In the process as claimed in claim 1 effecting the treatment with the low boiling hydrocarbon under an elevated pressure above 20 atmospheres.

4. In the process as claimed in claim 1 treating the initial carbonaceous material with a normally gaseous hydrocarbon.

5. In the process as claimed in claim 1 treating the initial carbonaceous material with a normally gaseous hydrocarbon selected from the group consisting of ethane and propane.

6. In the process as claimed in claim 1 treating the initial carbonaceous material firstly with the vaporized low boiling hydrocarbon at a temperature which lies above the critical temperature of said low boiling hydrocarbon, and then at a temperature which is below the said critical temperature with the liquefied low boiling hydrocarbon.

7. In the process as claimed in claim 1 treating the initial carbonaceous material with from 2 to 7 times the amount of low boiling hydrocarbon.

8. A process for the separation of oil from a hydrocarbon mixture containing the same together with a from solid to semi-solid substance of the nature of resins, asphalts or waxes which comprises mixing said hydrocarbon mixture with a liquefied normally gaseous hydrocarbon, then treating said hydrocarbon mixture with the normally gaseous hydrocarbon under an elevated pressure above 5 atmospheres and at a temperature at which under the pressure employed the said normally gaseous hydrocarbon is in the vaporized state, thereupon changing the conditions of temperature and contingently of pressure maintained upon the resulting mixture of said hydrocarbon mixture and normally gaseous hydrocarbon so that an elevated temperature between 20° and the critical temperature of the said gaseous hydrocarbon and a pressure are established at which the liquefied state of this normally gaseous hydrocarbon is maintained, the oil contained in the initial hydrocarbon mixture thereby being dissolved in the liquefied normally gaseous hydrocarbon, and then separating the solution of the oil in the liquefied normally gaseous hydrocarbon from the undissolved part of the said hydrocarbon mixture.

9. A process for the recovery of a wax from a crude waxy material which comprises mixing said waxy material with a liquefied normally gaseous hydrocarbon, then treating said waxy material with the normally gaseous hydrocarbon under an elevated pressure above 5 atmospheres and at a temperature at which under the pressure employed the said normally gaseous hydrocarbon is in the vaporized state, thereupon changing the conditions of temperature and contingently of pressure maintained upon the resulting mixture of said waxy material and normally gaseous hydrocarbon so that an elevated temperature between 20° and the critical temperature of this gaseous hydrocarbon and a pressure are established at which the liquefied state of this normally gaseous hydrocarbon is maintained, the wax contained in the crude waxy material thereby being dissolved in the liquefied normally gaseous hydrocarbon, and then separating the solution of the wax in the liquefied normally gaseous hydrocarbon from the undissolved part of the said crude waxy material.

MATHIAS PIER.
AUGUST EISENHUT.